United States Patent
Yoon et al.

(10) Patent No.: US 10,457,556 B2
(45) Date of Patent: Oct. 29, 2019

(54) CARBON NANOSTRUCTURE PREPARATION METHOD, CARBON NANOSTRUCTURE PREPARED BY MEANS OF SAME, AND COMPOSITE MATERIAL COMPRISING SAME

(71) Applicant: LG CHEM, LTD., Seoul (KR)

(72) Inventors: Kwang Woo Yoon, Daejeon (KR); Ogsin Kim, Daejeon (KR); Hyun Woo Park, Daejeon (KR); Eugene Oh, Daejeon (KR); Uk Yeong Kim, Daejeon (KR); Seungyong Son, Daejeon (KR); Dong Hyun Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 124 days.

(21) Appl. No.: 15/522,984

(22) PCT Filed: Mar. 9, 2016

(86) PCT No.: PCT/KR2016/002342
§ 371 (c)(1),
(2) Date: Apr. 28, 2017

(87) PCT Pub. No.: WO2016/144092
PCT Pub. Date: Sep. 15, 2016

(65) Prior Publication Data
US 2018/0002178 A1 Jan. 4, 2018

(30) Foreign Application Priority Data
Mar. 9, 2015 (KR) .................. 10-2015-0032669

(51) Int. Cl.
*C01B 32/164* (2017.01)
*C01B 32/05* (2017.01)
(Continued)

(52) U.S. Cl.
CPC ............ *C01B 32/164* (2017.08); *B01J 8/1809* (2013.01); *B01J 8/1827* (2013.01); *C01B 32/05* (2017.08);
(Continued)

(58) Field of Classification Search
CPC ........ C01B 32/16; C01B 32/164; C01B 32/05; H01B 13/0036; B01J 8/1827;
(Continued)

(56) References Cited

U.S. PATENT DOCUMENTS

| 5,284,676 A | 2/1994 | Accuntius et al. |
| 2004/0151654 A1 | 8/2004 | Wei et al. |

(Continued)

FOREIGN PATENT DOCUMENTS

| CN | 1327943 A | 12/2001 |
| CN | 102076605 A | 5/2011 |

(Continued)

OTHER PUBLICATIONS

Dong Young Kim et al: "Fluidized bed synthesis of sub-millimeter-long single-walled carbon nanotube arrays", 36th Fullerene-Nanotubes General Sympo, vol. 50, No. 4, Mar. 2, 2009 (Mar. 2, 2009), pp. 1535-1548, XP008155340.
(Continued)

*Primary Examiner* — Daniel C. McCracken
(74) *Attorney, Agent, or Firm* — Dentons US LLP

(57) ABSTRACT

The present invention relates to a method for producing carbon nanostructures using a fluidized bed reactor. According to the method, some of the as-produced carbon nanostructures remain uncollected and are used as fluidic materials to improve the fluidity in the reactor. The method enables the production of carbon nanostructures in a continuous process. In addition, the fluidity of the catalyst and (Continued)

the fluidic materials in the reactor is optimized, making the production of carbon nanostructures efficient.

12 Claims, 3 Drawing Sheets

(51) Int. Cl.
| | | |
|---|---|---|
| *B01J 8/18* | (2006.01) | |
| *H01B 13/00* | (2006.01) | |
| *C01B 32/16* | (2017.01) | |
| *B82Y 30/00* | (2011.01) | |
| *B82Y 40/00* | (2011.01) | |

(52) U.S. Cl.
CPC .......... *C01B 32/16* (2017.08); *H01B 13/0036* (2013.01); *B01J 2208/00725* (2013.01); *B01J 2208/00752* (2013.01); *B01J 2208/00761* (2013.01); *B82Y 30/00* (2013.01); *B82Y 40/00* (2013.01); *Y02P 20/582* (2015.11); *Y10S 977/742* (2013.01); *Y10S 977/843* (2013.01); *Y10S 977/932* (2013.01)

(58) Field of Classification Search
CPC ............ B01J 8/1809; B01J 2208/00761; B01J 2208/00752; B01J 2208/00725; Y02P 20/582; Y10S 977/843; Y10S 977/742; Y10S 977/932; B82Y 30/00; B82Y 40/00
See application file for complete search history.

(56) References Cited

U.S. PATENT DOCUMENTS

| | | |
|---|---|---|
| 2004/0234445 A1 | 11/2004 | Serp et al. |
| 2010/0276644 A1 | 11/2010 | Wolf et al. |
| 2011/0158892 A1 | 6/2011 | Yamaki |
| 2012/0251433 A1* | 10/2012 | Gaillard ................ B82Y 30/00 |
| | | 423/447.3 |
| 2015/0059571 A1 | 3/2015 | Denton et al. |

FOREIGN PATENT DOCUMENTS

| | | |
|---|---|---|
| CN | 104254491 A | 12/2014 |
| JP | 08501126 A | 2/1996 |
| JP | 2010030887 A | 2/2010 |
| JP | 2011016701 A | 1/2011 |
| JP | 2011506255 A | 3/2011 |
| JP | 2011093945 A | 5/2011 |
| JP | 2014513661 A | 6/2014 |
| WO | 2013158440 A1 | 10/2013 |

OTHER PUBLICATIONS

Yu, Hao, "Growth of branch carbon nanotubes on carbon nanotubes as support," Diamond and Related Materials, 2006, Sep. 15, 2006, 1447-1451.

Wang, Yao, "Agglomerated carbon nanotubes and its mass production in a fluidized-bed reactor," Physica B: Condensed Matter, 2002, 323, 1-4, 327-329.

* cited by examiner

[Fig. 1]
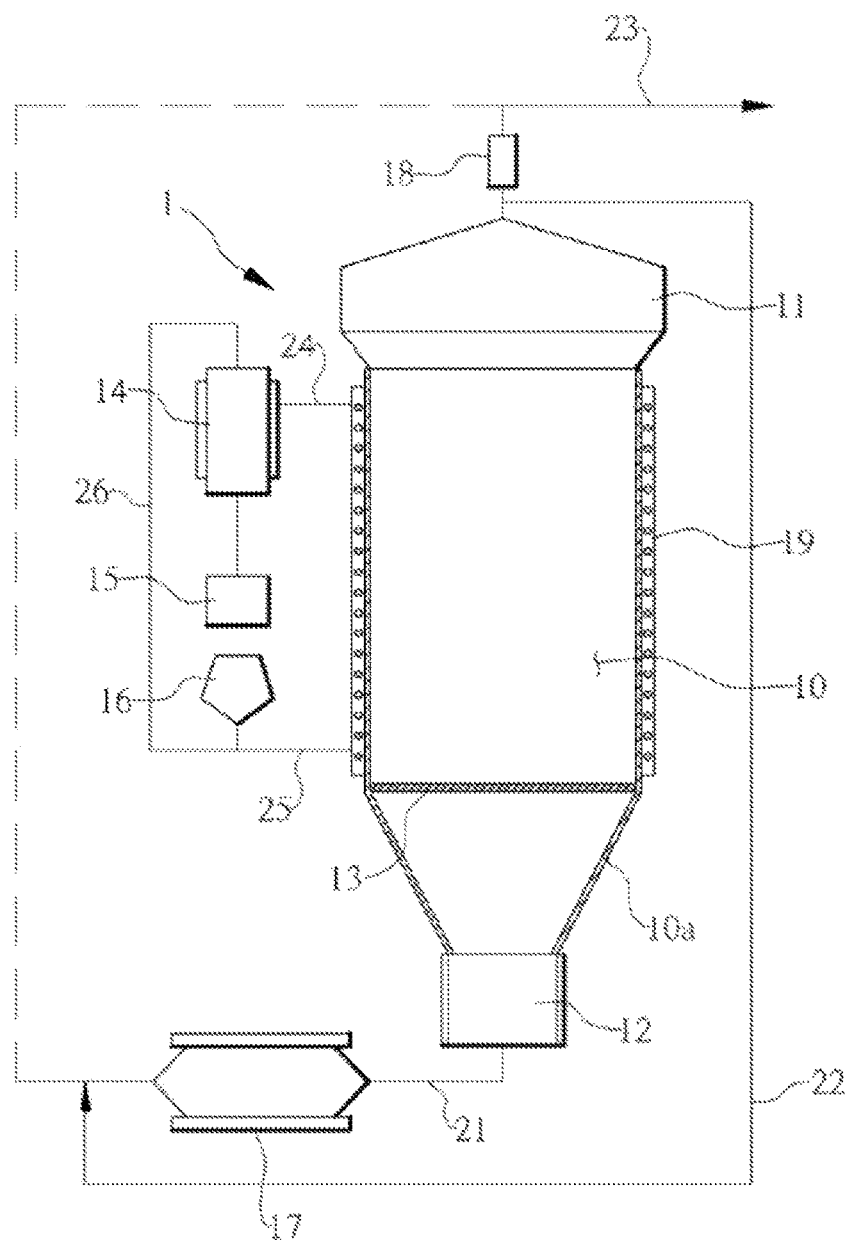

[Fig. 2]
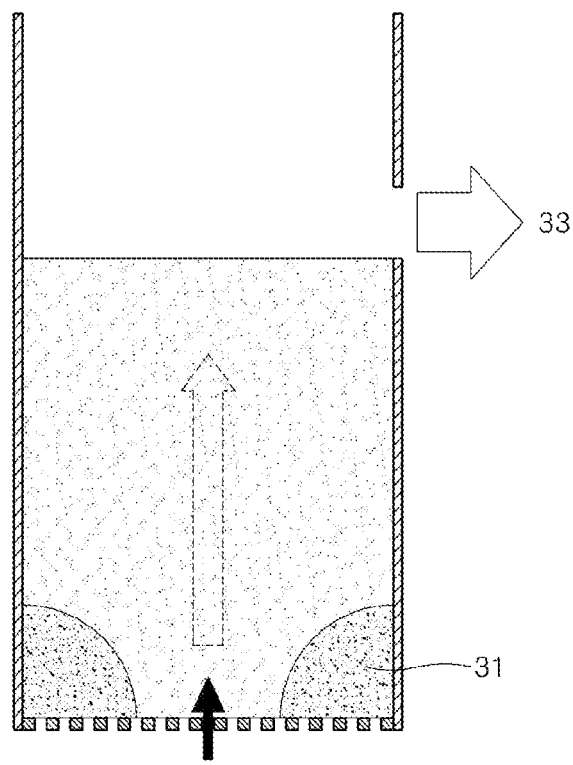
[Fig. 3]
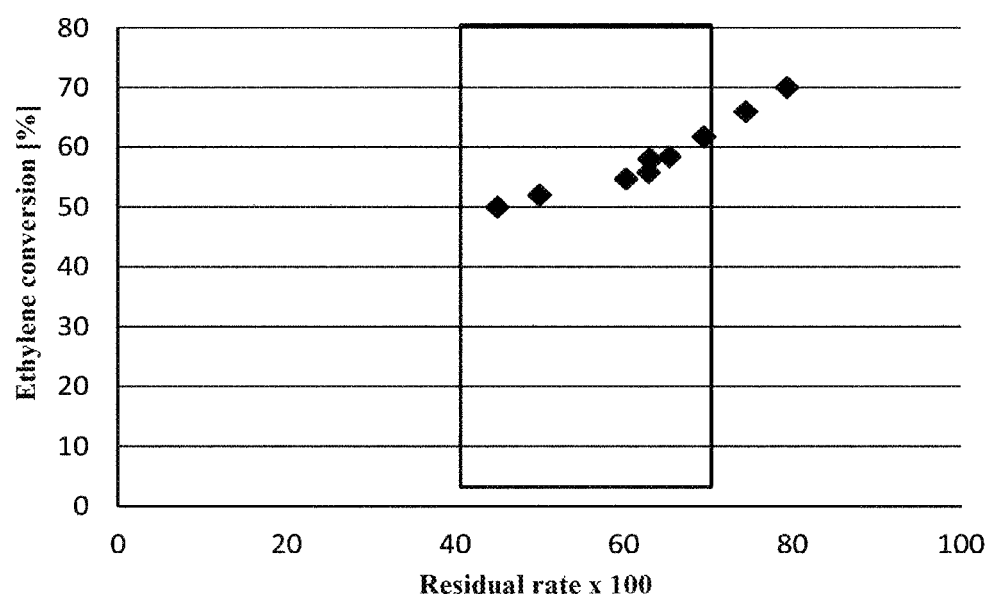

[Fig. 4]
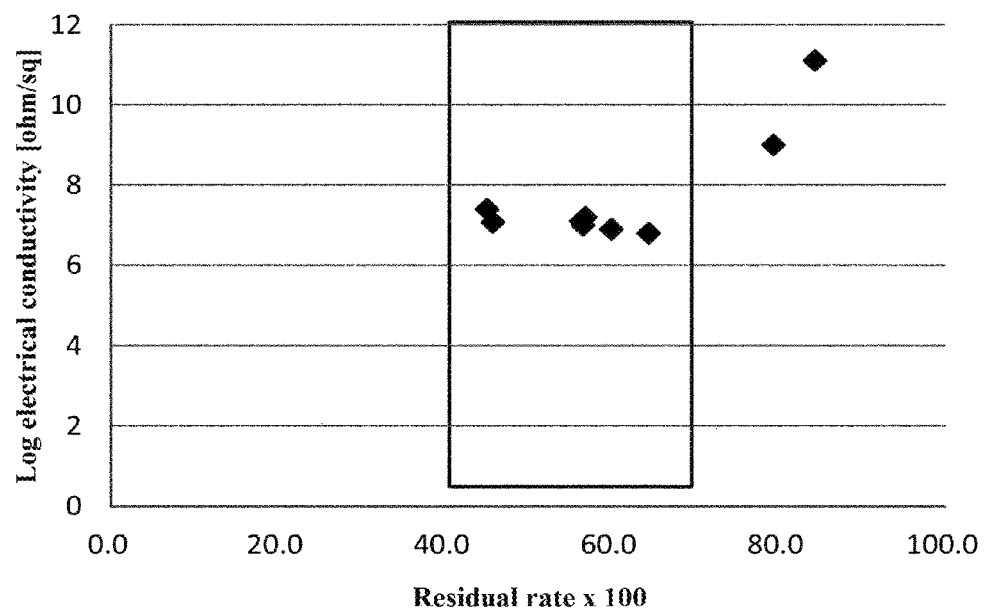

CARBON NANOSTRUCTURE PREPARATION METHOD, CARBON NANOSTRUCTURE PREPARED BY MEANS OF SAME, AND COMPOSITE MATERIAL COMPRISING SAME

This application is a 35 USC § 371 National Stage entry of International Application No. PCT/KR2016/002342, filed on Mar. 9, 2016, which claims priority to and the benefit of Korean Patent Application No. 10-2015-0032669 filed in the Korean Intellectual Property Office on Mar. 9, 2015, the entire contents of which are incorporated herein by reference.

BACKGROUND OF THE INVENTION

1. Field of the Invention

This application claims the benefit of priority to Korean Patent Application No. 10-2015-0032669, filed on Mar. 9, 2015, the entire disclosure of which is incorporated herein by reference.

The present invention relates to a method for producing carbon nanostructures in a continuous process by using some of the as-produced carbon nanostructures as fluidic materials, carbon nanostructures produced by the method, and a composite including the carbon nanostructures.

2. Description of the Related Art

Fluidized bed reactors are reactor devices that can be used to carry out a variety of multiphase chemical reactions. In such a fluidized bed reactor, a gas or liquid as a fluid reacts with a particulate solid material. The solid material is typically a catalyst having a small spherical shape, the fluid flows at a velocity sufficient to cause the solid material to float, and as a result, the solid material behaves similarly to the fluid.

Generally, carbon nanostructures (CNSs) refer to nano-sized carbon structures having various shapes, such as nanotubes, nanofibers, fullerenes, nanocones, nanohorns, and nanorods. Carbon nanostructures can be widely utilized in a variety of technological applications because they exhibit excellent characteristics.

Carbon nanotubes (CNTs) as representative carbon nanostructures are tubular materials in which adjacent carbon atoms are bonded together in a hexagonal honeycomb structure and the resulting carbon sheets are rolled into cylinders. Carbon nanotubes exhibit metallic or semiconducting properties depending on their structure, i.e. the orientation of hexagons in the tubes. Due to these characteristics, carbon nanotubes can find a wide range of applications in diverse technological fields. For example, carbon nanotubes are applicable to secondary batteries, fuel cells, electrodes of electrochemical storage devices (e.g., supercapacitors), electromagnetic wave shields, field emission displays, and gas sensors.

Carbon nanotubes can be produced by techniques, such as arc discharge, laser ablation, and chemical vapor deposition. According to chemical vapor deposition, carbon nanostructures are typically formed by dispersing and reacting metal catalyst particles and a gaseous hydrocarbon raw material in a fluidized bed reactor at a high temperature. That is, the metal catalyst reacts with the gaseous raw material while floating in the gaseous raw material in the fluidized bed reactor and carbon nanostructures continue to grow during the reaction.

Methods for producing carbon nanostructures using a fluidized bed reactor are disclosed, for example, in Korean Patent Publication Nos. 10-2009-0073346 and 10-2009-0013503. The fluidized bed reactor uses a distribution plate that permits a gas to be uniformly distributed in the reactor but prevents a powder, such as a catalyst, from passing downwardly therethrough. A perforated plate, a bubble cap, a sieve or a nozzle is generally used as the distribution plate.

In the fluidized bed reactor, the gas flows upwardly through the distribution plate to allow a particle bed on the distribution plate to float in a fluidized state. However, the upward gas flow does not ensure sufficient mixing of the powder with the gas or causes the particles to stay only for a short time in the reactor. In this case, carbon nanostructures tend to aggregate and settle down on the upper surface of the distribution plate due to their strong van der Waals attractive force, the catalyst continues to accumulate on the aggregates, and new carbon nanostructures grow on the catalyst. Thus, the carbon nanostructures increase gradually in size, impeding the fluidity of the gas and the catalyst in the reactor. As a result, satisfactory growth of the gas into carbon nanostructures cannot be expected, causing long operating time or poor product yield. Further, unreacted catalyst is deposited on the distribution plate or clogs the pores of the distribution plate. This obstructs uniform supply of the reactant gas and creates a pressure drop, making it difficult to stably operate the fluidized bed.

According to a batch type method for producing carbon nanostructures, after collection of carbon nanostructures from a reactor, the reactor is cooled and a new catalyst is added thereto. The subsequent heating of the reactor is very time- and cost-consuming and the contact time of a reaction raw material with the catalyst is short. Further, the absence of a fluidic material makes it difficult for the reaction to proceed.

SUMMARY OF THE INVENTION

One object of the present invention is to provide a method for producing homogeneous carbon nanostructures by inducing sufficient and uniform contact between reactant gases and a catalyst and carbon nanostructures produced by the method.

Another object of the present invention is to provide a conductive composite including carbon nanostructures produced by the method.

One aspect of the present invention provides a method for producing carbon nanostructures, including allowing a catalyst and reactant gases including a carbon source to flow in a fluidized bed reactor to synthesize carbon nanostructures wherein some of the carbon nanostructures remain uncollected and are used as fluidic materials in the fluidized bed reactor and wherein the residual rate of the fluidic materials is from 0.4 to 0.7, as calculated by Equation 1:

$$\text{Residual rate of carbon nanostructures} = \text{Volume of remaining carbon nanostructures}/(\text{Volume of initially remaining carbon nanostructures} + \text{Volume of as-produced carbon nanostructures}) \quad \text{[Equation 1]}$$

According to one embodiment, the residual rate of carbon nanostructures may be determined from the difference in pressure between the bottom and top of the reactor.

According to one embodiment, the conversion of the carbon source may be 50% or above.

According to one embodiment, the residual rate y and the conversion x of the carbon source may satisfy the relation given by Equation 2:

$$y = px + q \quad \text{[Equation 2]}$$

where p is a constant from 0.4 to 0.7 and q is a constant from 15 to 30.

According to one embodiment, the amount of the catalyst supplied to the reactor may satisfy the relation given by Equation 3:

$$b/(a+b) \leq 0.1 \quad \text{[Equation 3]}$$

where a is the weight (g) of the carbon nanostructures remaining in the fluidized bed reactor and b is the weight (g) of the catalyst supplied.

According to one embodiment, the collection of the synthesized carbon nanostructures and the supply of the catalyst may be performed in a continuous process.

The collection cycle of the synthesized carbon nanostructures and the supply cycle of the catalyst may be determined based on the degree of filling of the synthesized carbon nanostructures in the reactor.

According to one embodiment, the reactant gases may further include a reducing gas and/or an inert gas.

According to one embodiment, the synthesized carbon nanostructures may be collected under a flow of an inert gas.

According to one embodiment, the synthesis of carbon nanostructures may be continued by continuously supplying the reactant gases including a carbon source during the collection of the synthesized carbon nanostructures.

According to one embodiment, an inert gas may be continuously supplied to the reactor to form a fluidized bed of the remaining carbon nanostructures even after the collection of the synthesized carbon nanostructures.

According to one embodiment, the reactor may include a pipe through which the catalyst is supplied, a pipe through which the reactant gases including a carbon source are supplied, and a discharge pipe disposed under the bottom of the reactor and through which the synthesized carbon nanostructures are collected.

According to one embodiment, the reactor may be a chemical vapor deposition reactor.

The carbon nanostructures may be carbon nanotubes.

The present invention also provides carbon nanostructures produced by the method.

According to one embodiment, the carbon nanostructures may have a bulk density of 10 to 300 kg/m³.

The present invention also provides a composite including carbon nanostructures produced by the method.

According to one embodiment, the composite may have a sheet resistance of $10^8$ Ω/sq or less.

The method of the present invention enables the production of carbon nanostructures in a continuous process by using some of the as-produced carbon nanostructures as fluidic materials. According to the method of the present invention, an optimal proportion of carbon nanostructures as fluidic materials is provided such that the contact time between a carbon source and a catalyst is extended and the flow of the fluidic materials is optimized, achieving improved conversion efficiency of the carbon source. The use of the fluidic materials of the same kind as the final products eliminates the need for subsequent separation of the fluidic materials, leading to high process efficiency. In addition, the method of the present invention enables the production of carbon nanostructures with high purity.

BRIEF DESCRIPTION OF THE DRAWINGS

FIG. 1 is a schematic view of an exemplary fluidized bed reactor for the production of carbon nanostructures.

FIG. 2 is a schematic view showing problems of a fluidized bed reactor according to the prior art.

FIG. 3 shows the conversions of ethylene gas to carbon nanotubes with varying residual rates of the carbon nanotubes according to working example.

FIG. 4 shows the conductivities of composites including carbon nanotubes produced according to working example.

DETAILED DESCRIPTION OF THE INVENTION

The present invention will now be described in more detail with reference to embodiments illustrated in the accompanying drawings. However, this is not intended to limit the present invention to particular modes of practice, and it is to be appreciated that all changes, equivalents, and substitutes that do not depart from the spirit and scope of the present invention are encompassed in the present invention.

Like reference numerals refer to the like elements throughout the drawings.

It will be understood that when an element is referred to as being "connected" or "coupled" to another element, it can be directly connected or coupled to the another element or intervening elements may be present.

As used herein, an expression used in the singular encompasses the expression of the plural, unless the context clearly indicates otherwise.

The terms "comprises", "comprising", "includes", "including", "has", "having", etc. are intended to indicate the existence of features, numbers, steps, operations, elements, components or combinations thereof disclosed in the specification, and are not intended to preclude the possibility that one or more other features, numbers, steps, operations, elements, components or combinations thereof may exist or may be added.

In a fluidized bed reactor, a catalyst is uniformly distributed and comes into good contact with reactant gases, heat is easily diffused when the reaction is exothermic, and the catalyst and desired carbon nanostructures stay for a sufficient time. Due to these advantages, the fluidized bed reactor enables the production of carbon nanostructures in high yield (high ratio of the amount of the carbon nanostructures to the amount of the catalyst). In addition, the use of the reactor facilitates the mass production of carbon nanostructures with high productivity per unit volume of the reactor.

In the fluidized bed reactor, the gas flows upwardly through the distribution plate to allow a particle bed on the distribution plate to float in a fluidized state. However, the upward gas flow does not ensure sufficient mixing of the powder with the gas or causes the particles to stay only for a short time in the reactor, as illustrated in FIG. 2. In this case, carbon nanostructures tend to aggregate and settle down on the upper surface of the distribution plate due to their strong van der Waals attractive force, the catalyst continues to accumulate on the aggregates, and new carbon nanostructures grow on the catalyst. Thus, the carbon nanostructures increase gradually in size, impeding the fluidity of the gas and the catalyst in the reactor.

The present invention is intended to provide a method for producing carbon nanostructures in a more efficient manner by leaving a predetermined amount of the as-produced carbon nanostructures as fluidic materials in a fluidized bed reactor to improve the fluidity of the fluidized bed, instead of collecting all the as-produced carbon nanostructures.

A method for producing carbon nanostructures according to the present invention includes allowing a catalyst and reactant gases including a carbon source to flow in a fluidized bed reactor to synthesize carbon nanostructures wherein some of the carbon nanostructures remain uncollected and are used as fluidic materials in the fluidized bed reactor and wherein the residual rate of the fluidic materials is from 0.4 to 0.7, as calculated by Equation 1:

Residual rate of carbon nanostructures=Volume of remaining carbon nanostructures/(Volume of initially remaining carbon nanostructures+Volume of newly produced carbon nanostructures) [Equation 1]

According to one embodiment, the residual rate of carbon nanostructures may be determined from the difference in pressure between the bottom and top of the reactor. Specifically, the bottom of the reactor indicates a point under a distribution plate of the reactor and the top of the reactor indicates the highest point of the carbon nanostructures accumulated in the reactor. Since the pressures at both points are proportional to the weight of the carbon nanostructures in the reactor, the residual rate can be calculated from the pressure difference.

According to one embodiment, the collection of the synthesized carbon nanostructures and the supply of the catalyst may be performed in a continuous process.

According to a batch type method for producing carbon nanostructures, after collection of carbon nanostructures from a reactor, the reactor is cooled and a fluidic material or a new catalyst is added thereto. In contrast, according to the method of the present invention, some carbon nanostructures remain uncollected in the reactor and are used as fluidic materials for the production of new carbon nanostructures. Accordingly, the method of the present invention enables the production of carbon nanostructures in a continuous manner without the need to collect all as-produced carbon nanostructures and to evacuate and cool the reactor. In addition, the method of the present invention can overcome the drawbacks of conventional batch type methods involving cooling of a reactor and subsequent heating of the reactor, which cause time and energy inefficiency.

As the amount of the fluidic carbon nanostructures in the reactor increases, the fluidity of the catalyst and the gaseous raw material in the reactor increases, resulting an increase in contact time between the catalyst and the gaseous raw material. The increased contact time leads to an increase in the conversion of the carbon source. However, the retention times of the synthesized carbon nanostructures and the catalyst increase, resulting in poor physical properties of the synthesized carbon nanostructures.

In the case where the fluidic carbon nanostructures are used in an amount below the predetermined level, the fluidity of the catalyst is not sufficiently ensured. In this case, the contact time between the catalyst and the carbon source is shortened, failing to obtain a sufficient conversion of the carbon source. As a result, the process yield and purity of carbon nanostructures may be lowered. When the fluidic carbon nanostructures are used in the range defined by Equation 1, the ratio between the volume of the fluidic carbon nanostructures remaining in the reactor and the volume of newly synthesized carbon nanostructures is optimized so that carbon nanostructures with satisfactory physical properties can be efficiently produced with high conversion from the carbon source. The carbon nanostructures filled in the reactor may be collected when they reach a predetermined volume. The time when the carbon nanostructures are collected can be determined based on the height of the carbon nanostructures filled in the reactor. Based on this volume, the proportion of the fluidic carbon nanostructures can be determined. That is, the final filling volume would be a criterion in determining the amounts of the remaining carbon nanostructures and the collected carbon nanostructures, as defined in Equation 1.

According to one embodiment, the conversion of the carbon source may be 50% or above.

Specifically, the residual rate y and the conversion x of the carbon source may satisfy the relation given by Equation 2:

$$y=px+q \quad \text{[Equation 2]}$$

where p is a constant from 0.4 to 0.7 and q is a constant from 15 to 30.

p may be a constant from 0.4 to 0.6, 0.5 to 0.7 or 0.5 to 0.6.

q may be a constant from 15 to 25, 20 to 30 or 20 to 25.

A study conducted by the present inventors shows that the residual rate increases linearly with the conversion of the carbon source.

According to one embodiment, the catalyst supply rate may be greater than 0 but not greater than 0.1, as defined by Equation 3:

$$\text{Catalyst supply rate}=b/(a+b) \quad \text{[Equation 3]}$$

where a is the weight (g) of the carbon nanostructures remaining in the fluidized bed reactor and b is the weight (g) of the catalyst supplied.

Preferably, the catalyst supply rate is not greater than 0.08 or not greater than 0.05.

The amount of the catalyst supplied to the reactor and the amount of the fluidic materials remaining in the reactor may affect the circulation of the catalyst and act as important factors in the contact time between the carbon source and the catalyst. If the catalyst supply rate exceeds 0.1, the fluidity of the fluidized bed may deteriorate. In this case, the circulation of the catalyst is impeded, and as a result, the contact time between the carbon source gas and the catalyst decreases, resulting in low conversion of the carbon source. When the catalyst is supplied at the rate defined above, the fluidity of the catalyst by the fluidic materials can be ensured and the conversion of the carbon source can be optimized.

The optimized catalyst supply rate ensures smooth circulation of the catalyst and the gaseous raw material, which prevents the localization of the catalyst or the occurrence of volume expansion caused by a rapid heterogeneous reaction between the catalyst and the carbon source gas, contributing to the production of more uniform carbon nanostructures.

The collection cycle of the synthesized carbon nanostructures and the supply cycle of the catalyst may be determined based on the degree of filling of the synthesized carbon nanostructures in the reactor.

For example, when the amount of carbon nanostructures produced reaches the predetermined level, the reaction is stopped, some of the as-produced carbon nanostructures are left in the reactor, the remainder of the carbon nanostructures are collected by opening a valve positioned in a discharge line, and a new catalyst is added to the remaining carbon nanostructures. Thus, carbon nanostructures can be produced in a continuous process. The amount of the catalyst supplied depends on the catalyst supply rate defined in Equation 1.

The amount of carbon nanostructures filled in the reactor may be determined based on the height or weight of the carbon nanostructures. For example, the amount of carbon nanostructures filled in the reaction furnace may be controlled by multipoint probes positioned at different heights of the reaction furnace. When carbon nanostructures reach a predetermined level, the reaction furnace is considered as being sufficiently filled with the carbon nanostructures.

The time when the carbon nanostructures are collected may be determined by various methods, for example, by detecting the levels of remaining gases using suitable detection devices. In this case, only when the levels reach predetermined values is the synthesis completed for the collection of the carbon nanostructures.

According to one embodiment, the reactant gases supplied to the fluidized bed reactor may further include a reducing gas and/or an inert gas in addition to the carbon source gas.

The carbon nanostructures remaining uncollected in the reactor may form a continuous fluidized bed. The fluidity of the fluidic materials may be created by the supply of an inert gas. When the catalyst and the reactant gases are supplied to the reactor in which a fluidized bed has previously been formed, the synthesis of carbon nanostructures begins to take place.

According to the present invention, a flowable gas, such as an inert gas, may be continuously supplied to facilitate the collection of carbon nanostructures. Alternatively, the reaction may be continued by the supply of the reactant gases together with a flowable gas even during the collection of carbon nanostructures proceeds.

According to one embodiment, the collection of carbon nanostructures and the supply of the catalyst and the reactant gases may be performed sequentially. For example, valves provided at outlets of the reactor may be sequentially opened for sequential collection of carbon nanostructures. The supply of the gaseous raw material is stopped when carbon nanostructures are collected, i.e. when a valve is opened, and the gaseous raw material is again supplied when the valve is closed. In this manner, the synthesis of carbon nanotubes can be continued simultaneously with the collection of carbon nanotubes.

According to one embodiment, the amount of the collected carbon nanostructures is from 10 to 90% by weight, preferably from 30 to 60% by weight, based on the total amount of the carbon nanotubes produced. In other words, the amount of the carbon nanostructures remaining in the reactor is from 10 to 90% by weight, preferably 40 to 60% by weight.

According to one embodiment, the conversion of the carbon source may be 50% or above.

According to one embodiment, the carbon nanostructures remaining as fluidic materials in the reactor may have a bulk density of 10 to 300 kg/m$^3$.

More preferably, the carbon nanostructures have an average particle diameter in the range of about 200 μm to about 500 μm or about 270 μm to 420 μm. Within this range, the retention and accumulation of the carbon nanostructures can be prevented. The average particle diameter means a volume average particle diameter which is measured based on 90% in an absorption mode using a Microtrac particle size analyzer after the carbon nanostructures are allowed to stand in distilled water for 3 hours.

Any fluidized bed reactor suitable for the production of carbon nanostructures may be used without limitation in the present invention. Preferably, the fluidized bed reactor includes a reactor in which carbon nanostructures are synthesized, a pipe through which a catalyst is supplied, and a discharge pipe disposed under the bottom of the reactor and through which the synthesized carbon nanostructures are collected.

According to the present invention, the collection pipe of the fluidized bed reactor is disposed under the bottom of the reaction furnace, which is advantageous in producing carbon nanostructures in a continuous process. After the reaction is substantially completed, the resulting aggregates fall on the bottom by the force of gravity. Accordingly, the products can be collected without the need to stop heating of the reaction furnace, and at the same time, unreacted material is allowed to continuously react to synthesize carbon nanostructures. The synthesized carbon nanostructures can be easily collected even in a state in which the reactor is heated without the need to cool the reactor, unlike in conventional batch methods. Therefore, the method of the present invention is advantageous in terms of time and economic efficiency.

That is, the fluidized bed reaction furnace having an outlet disposed under the bottom thereof may include a valve closure system adapted to sequentially collect carbon nanostructures. The system is arranged at the outlet of the reaction furnace and enables sequential collection of carbon nanostructures even at the reaction temperature.

The valve closure system may be selected from mechanical valves equipped with thermostats and non-mechanical valves, such as L-valves and J-valves. Preferred is a non-mechanical valve, such as an L-valve or J-valve.

FIG. 1 schematically illustrates the construction of a general fluidized bed reactor. The fluidized bed reactor can be used for the production of carbon nanostructures but is not limited to this use.

Referring to this figure, the fluidized bed reactor 1 includes a reactor body 10 having a downward-tapered zone 10a in the lower portion thereof. A heater 19 is provided along the outer circumference of the reactor body 10 to heat the reactor body 10.

A supply unit 12 is provided in the lower portion of the fluidized bed reactor 1 to supply a gaseous raw material to the reactor body. For example, the gaseous raw material may be a hydrocarbon-based gas for the production of carbon nanostructures. The gaseous raw material is supplied to the reactor body 10 through a supply pipe 21 connected to the supply unit 12. The gaseous raw material may be preheated in a preheater 17 before supplied to the reactor body 10. A distribution plate 13 is arranged under an internal reaction space of the reactor body 10. The gaseous raw material is dispersed into the internal reaction space of the reactor body 10 through the distribution plate 13.

An expander 11 is provided on top of the reactor body 10. The expander 11 may include a separator (not illustrated) for preventing a catalyst and reaction products (e.g., carbon nanostructures) from being discharged from the reactor body 10 to the outside. A filter 18 is connected to the expander 11. The component gas passes through the filter 18 and is transferred through a transfer pipe 23. A recycling pipe 22 is connected to the expander 11. A portion of a gas mixture discharged from the expander 11 is recycled to the supply pipe 21 through the recycling pipe 22.

A separator 14 is connected to one upper side of the reactor body 10 through a pipe 24. The separator 14 serves to separate the products from the gas mixture discharged from the reactor body 10. For example, the separator 14 separates carbon nanostructures from the gas mixture. A collector 15 is connected to one side of the separator 14 to collect the products, such as carbon nanostructures. The separator 14 is connected to one lower side of the reactor body 10 through a pipe 26. A catalyst feeder 16 is connected to the pipe 26 through which the catalyst can be supplied to the reactor body 10. Although not illustrated, a blower is provided in the pipe 26 to forcibly send the gas mixture separated in the separator 14 and the catalyst supplied from the catalyst feeder 16 to the reactor body 10.

The reactor may be a chemical vapor deposition reactor and is preferably a fluidized bed reactor.

At least 10 minutes is required for the reactant gas to react with catalyst to synthesize carbon nanostructures by chemical vapor deposition (CVD). Thus, the retention times of desired carbon nanostructures and the catalyst in the reactor have an important influence on the purity and yield of the carbon nanostructures.

According to the present invention, a carbon source, a reducing gas, and an inert gas are supplied to the reactor, in which carbon nanostructures are present, through the supply pipe 21. The reactant gases entering through the supply pipe 21 flow from the bottom to the top of the reactor 10. As the reaction proceeds, the products are discharged through one upper side of the reactor and the carbon nanostructures are separated in the separator 14.

The supply pipe 21 is not particularly limited so long as it can be used in an apparatus for producing carbon nanostructures. Specifically, the supply pipe 21 may be a gas distributor.

The supply pipe 25 is not particularly limited so long as it can be used in an apparatus for producing carbon nanostructures. Specifically, the supply pipe 25 may be a catalyst supply system including a hopper, a feeder, a screw feeder, and a rotary airlock valve.

The fluidized bed reactor is operated in such a manner that the catalyst comes into contact with the reactant gases in a fluidized bed formed in the reactor. As the reaction proceeds, carbon nanostructures grow on an active metal of the catalyst. When the bulk density of the products decreases to a predetermined level, the products are discharged to the outside through the discharge pipe connected to one upper side of the reactor.

The fluidization velocity of the fluidized bed formed in the fluidized bed reactor is preferably from 0.03 to 100 cm/s, more preferably 0.1 to 70 cm/s.

The minimum fluidization velocity of the fluidized bed in the fluidized bed reactor is preferably from 0.03 to 15 cm/s, more preferably 0.1 to 10 cm/s.

The pipe 25 through which the catalyst is supplied, the pipe 21 through which reactant gases including a carbon source, a reducing gas, and an inert gas are supplied, the pipe 24 through which carbon nanostructures and a gas mixture including by-produced gases are discharged may be connected to the fluidized bed reactor.

Any catalyst suitable for use in the production of carbon nanostructures may be used in the present invention. For example, the catalyst may be a heterogeneous catalyst having a hybrid structure consisting of an active metal and a support. More specifically, the catalyst may be selected from supported catalysts and coprecipitated catalysts. Supported catalysts are preferably used for the following reasons: supported catalysts have a higher inherent bulk density than coprecipitated catalysts; unlike coprecipitated catalysts, supported catalysts produce a small amount of a fine powder with a size of 10 microns or less, which prevents fine particles from agglomeration and reduces the possibility of occurrence of a fine powder due to attrition during fluidization; and high mechanical strength of supported catalysts effectively stabilizes the operation of reactors.

Coprecipitated catalysts are economically advantageous because they are easy to prepare from inexpensive metal salts as raw materials. In addition, coprecipitated catalysts have high catalytic activity due to their large specific surface area.

The catalytic metal used in the present invention is not particularly limited so long as it can promote the growth of carbon fibers. Examples of such catalytic metals include metals of Groups 3 to 12 in the 18-group type Periodic Table of the elements recommended by IUPAC in 1990. The catalytic metal is preferably selected from the group consisting of the metals of Groups 3, 5, 6, 8, 9, and 10. Particularly preferred is at least one metal selected from iron (Fe), nickel (Ni), cobalt (Co), chromium (Cr), molybdenum (Mo), tungsten (W), vanadium (V), titanium (Ti), ruthenium (Ru), rhodium (Rh), palladium (Pd), platinum (Pt), and rare earth elements. A compound containing the catalytic metal element may be used as a catalytic metal precursor. For example, the catalytic metal precursor may be an inorganic salt (e.g., a nitrate, sulfate or carbonate) of the catalytic metal, an organic salt (e.g., an acetate) of the catalytic metal, an organic complex (e.g., an acetylacetone complex) of the catalytic metal, and an organometallic compound of the catalytic metal.

It is widely known that a reaction activity is controlled by using a combination of two or more catalytic metals and catalytic metal precursor compounds, for example, a combination of at least one element selected from iron (Fe), cobalt (Co), and nickel (Ni), at least one element selected from titanium (Ti), vanadium (V), and chromium (Cr), and at least one element selected from molybdenum (Mo) and tungsten (W).

Specifically, the catalyst used in the preparation of the carbon nanostructures may be prepared by dissolving $Co(NO_3)_2 \cdot 6H_2O$, $(NH_4)_6Mo_7O_{24} \cdot 4H_2O$, $Fe(NO_3)_2 \cdot 6H_2O$ or $Ni(NO_3)_2 \cdot 6H_2O$ as a catalytically active metal precursor in distilled water and wet impregnating the solution into a support, such as $Al_2O_3$, $SiO_2$ or MgO.

Specifically, the catalyst may be prepared by sonicating a catalytically active metal precursor and a support, such as $Al(OH)_3$, $Mg(NO_3)_2$ or colloidal silica.

Alternatively, the catalyst may be prepared by a sol-gel process. In this case, a chelating agent, such as citric acid or tartaric acid, is used to sufficiently dissolve a catalytically active metal precursor in water. Alternatively, the catalyst may be prepared by co-precipitation of readily water-soluble catalytically active metal precursors.

Generally, a catalytic metal precursor compound in an oxidized state may be reduced to the corresponding catalytic metal by bringing it into contact with a reducing gas before contact with a carbon-containing compound.

The carbon source is a carbon-containing gas that may be decomposed when heated. Specific examples of such carbon sources include aliphatic alkanes, aliphatic alkenes, aliphatic alkynes, and aromatic compounds. More specific examples of such carbon sources include methane, ethane, ethylene, acetylene, ethanol, methanol, acetone, carbon monoxide, propane, butane, benzene, cyclohexane, propylene, butene, isobutene, toluene, xylene, cumene, ethylbenzene, naphthalene, phenanthrene, anthracene, acetylene, formaldehyde, and acetaldehyde. Preferred are methane ($CH_4$), ethane ($C_2H_6$), carbon monoxide (CO), acetylene ($C_2H_2$), ethylene ($C_2H_4$), propylene ($C_3H_6$), propane ($C_3H_8$), butane ($C_4H_{10}$), and mixtures thereof, for example, liquefied petroleum gas (LPG).

The reducing gas is preferably a hydrogen-containing gas.

The inert gas is used as a carrier gas and may be nitrogen gas, carbon dioxide gas, helium gas, argon gas, krypton gas or a mixed gas thereof. A gas containing oxygen molecules (i.e. molecular oxygen, $O_2$), such as air, is not suitable because it deteriorates the catalyst.

The carbon source may be a liquid or solid at room temperature. In this case, it is preferred to evaporate the carbon source into a gas by heating before use. It is impossible to uniformly determine the amount of the carbon source gas supplied that varies depending on the catalyst, the carbon-containing compound, and the reaction conditions. The carbon source gas is generally supplied in such an amount that the ratio of the flow rate of the carbon-containing gas to the sum of the flow rates of the carrier gas and the carbon-containing gas is preferably from 10 to 90 vol %, more preferably from 30 to 70 vol %.

According to the method of the present invention, the supported catalyst is brought into contact with the carbon-containing compound in the hot zone. The temperature of the hot zone varies depending on the kind of the carbon-containing compound used and is typically in the range of 400 to 1100° C., preferably 500 to 800° C. Outside this range, the yield of carbon nanotubes may be considerably lowered.

The separator 14 may be a unit, tool or device that can separate carbon nanostructures and the gas mixture. The separator 14 is preferably a cyclone but is not particularly limited thereto. The gas mixture may include by-produced gases from the reactor.

The filter may be a gas separation unit in which unreacted carbon source, the reducing gas, and the inert gas are separated from the gas mixture released from one or more separators connected to the expander. Another role of the filter is to selectively transfer necessary amounts of the separated gases to the recycling pipe.

The reducing gas may be hydrogen.

The gas separation unit may be of a metal membrane type in which a predetermined amount of the reducing gas is removed from the gas mixture released from the separators connected to the expander. The gas separation unit transfers the filtered gas mixture to the recycling pipe.

The gas separation unit of a metal membrane type is suitable for selective separation of hydrogen at a temperature lower than 600° C.

The gas separation unit may use one or more metal membranes made of at least one metal or alloy selected from the group consisting of Pd, Ir, Rh, Pd—Ni alloys, Pd—Ag alloys, and Pd—Cu alloys. The metal membranes are preferably made of Pd or a Pd-based alloy but are not limited thereto.

Each metal membrane requires at least a minimum area to efficiently separate the target gases. The use of one metal membrane is also possible so long as it has a sufficiently large area to obtain a desired flux. However, since dense thin membranes having a size larger than 100 mm×100 mm are not currently available, a stack of membranes having the largest possible size can also be used to ensure a desired surface area.

The metal membrane unit selectively removes hydrogen gas as a by-product of the reaction and is thus advantageous in terms of continuous processing, adsorption control, and recycling feed composition control. A single membrane made of Pd or a Pd alloy with high separation efficiency can also be used for separation and control over pressure and supply through the separation unit is enabled. The selectivity of the metal membranes for hydrogen over the carbon source and the inert gas approaches infinity. The flux ($H_2$ mol/$M^2$·sec) of hydrogen separated by the metal membranes tends to increase with increasing pressure and temperature. Large-area metal membranes do not need to be stacked to construct the separation unit. In the current state of the art, however, there is a limitation in producing highly efficient metal membranes having a size larger than 100 mm×100 mm. Thus, metal membranes having the largest possible size may be stacked together or connected in series to construct the system. The metal membranes may have various shapes, for example, rods or sheets.

For reference, it was confirmed that when the carbon nanostructures produced in the reactor and the gas mixture are separated from each other using the cyclone, the separated carbon nanostructures are collected through the discharge pipe connected to one upper side of the reactor, and the separated gas mixture is passed through the hydrogen separation unit and is recycled, the amounts of ethylene, hydrogen and nitrogen per the output of the carbon nanostructures can be reduced to 20-30%, 99%, and 98%, respectively, without the need to mount a heat exchanger.

Preferably, the gas separation unit consists of one or more metal membranes. More preferably, the gas separation unit has a structure in which metal membranes having the largest possible size are laminated or are connected in parallel or series to ensure a desired hydrogen permeation flux. In this case, hydrogen gas as a by-product of the reaction can be selectively removed by varying the pressure supplied to the membranes. This selective removal is advantageous in recycle feed composition control. A single membrane with high separation efficiency may also be used for separation. In the separation unit, separation is accomplished through pressure and feed control.

A portion of the specific gas (e.g., $H_2$) may be supplied to the recycling pipe, if needed, particularly when the filtered gas mixture is deficient in the specific gas.

The content of unreacted carbon source in the gas mixture is preferably adjusted to 2 to 30%, more preferably 5 to 25%, of the carbon source supplied to the reactor.

The apparatus used in the present invention enables the operation of an ideal process in which the composition and amounts of the reactants are maintained substantially constant by the supply of the catalyst and the carbon source consumed in the reactor.

The apparatus selectively removes hydrogen ($H_2$), which is a reducing gas by-produced during the production of carbon nanostructures, and recycles the gas mixture including the unreacted carbon source, the inert gas, and by-produced gases. In contrast, according to the prior art, the gas mixture is incinerated or released into the atmosphere using a flare stack or an incinerator. The series of selective removal and recycling can ensure a carbon source conversion of at least 98% without the need to supply of an additional inert gas, contributing to a remarkable reduction in the production cost of carbon nanostructures and eliminating the need for incineration. Based on these advantages, the use of the apparatus is free from problems associated with carbon dioxide release into the atmosphere and is thus considered environmentally friendly.

The apparatus requires low energy consumption. The fluidized bed reactor can be reduced in size for capacity and can thus be operated at 600 to 1000° C. at a greatly reduced energy cost.

A heat exchanger is essentially required to cool reactant gases when a gas mixture is separated using a pressure swing adsorption (PSA) polymer separation membrane. In contrast, the apparatus used in the present invention does not require the use of a heat exchanger, which makes the apparatus compact, decreases the investment cost of equipment, and leads to a reduction in the size of the reaction system. The hot reactant gases can be recycled through the recycling pipe without cooling, which reduces the amount of heat required in the preheater and contributes to a reduction in the size of the preheater.

The expression "between the reactor and the separator" is intended to include the internal space of the reactor. A filter for separating fine particles may also be arranged in the expander provided on top of the fluidized bed reactor.

Preferably, the apparatus further includes means for controlling the amount of the reactant gases supplied to the reactor and the amount of the component gas removed in the filter.

The control means may serve to control the amount of the reducing gas supplied to the reactor and the amount of the reducing gas passing through the filter.

Preferably, the apparatus further includes either a filter or a scrubber or both between the separator and the filter.

The filter collects the carbon nanostructures remaining in the gas mixture separated by the separator and the scrubber can remove harmful substances (e.g., halides) present in the gas mixture separated by the separator.

Preferably, the apparatus further includes a preheater for preheating the reactant gases in front of the reactor.

In a general apparatus for producing carbon nanostructures, the amount of an inert gas increases as the size of the reactor increases and a reducing gas should be supplied in an amount equal to or larger than the amount of a carbon source. Accordingly, the use of the apparatus in the present invention is very effective in reducing the production cost of carbon nanostructures.

Means for incinerating waste gases (e.g., a flare stack or an incinerator) may be omitted in the apparatus.

The method of the present invention may further include supplying to the filtered gas mixture a fresh carbon source in an amount corresponding to the amount of the carbon source consumed during the production of carbon nanotubes.

The method of the present invention does not involve incinerating waste gases.

The carbon nanostructures refer to nano-sized carbon structures having various shapes, such as carbon nanotubes, nanofibers, fullerenes, nanocones, nanohorns, and nanorods.

Only the essential parts necessary for describing the present invention are illustrated in FIG. 1 and the other parts, for example, pumps, valves, pipes, control units, and boosting units for pressurization, necessary for implementing the method of the present invention are omitted in FIG. 1.

The present invention will be explained in detail with reference to the following examples. However, these examples are in no way intended to limit the scope of the invention.

PRODUCTION EXAMPLE 1

A. Preparation of Aqueous Solution of Metal Catalyst Precursor $Co(NO_3)_2 \cdot 6H_2O$ as a Co precursor and $NH_4VO_3$ as a V precursor were dissolved in 20 ml of water in Flask A and citric acid was then added thereto. The Co precursor and the V precursor were added in such amounts that the molar ratio of Co:V was 10:1. The resulting aqueous metal solution was observed to be clear and free of precipitates.

B. Preparation of Support

Aluminum trihydroxide ($Al(OH)_3$, WH-50) as an aluminum-based support was calcined at 400° C. for 4 h to obtain 2.5 g of a support (ATH400). The support was placed in Flask B. XRD analysis revealed the presence of 40 wt % of AlO(OH) in the support.

C. Preparation of Supported Catalyst

The solution in Flask A was added to Flask B. The catalytic metal precursor was sufficiently supported on ATH400, followed by aging with stirring in a thermostatic bath at 60° C. for 5 min. The mixture was dried with rotation at 150 rpm under vacuum for 30 min while maintaining the temperature. The dried mixture was calcined at 120° C. for 1 h to prepare a homogeneous supported catalyst.

D. CNT Synthesis

A test for the synthesis of CNTs using the supported catalyst was conducted in a fluidized bed reactor on a pilot scale. Specifically, the catalyst was supplied to a 350 mm reactor containing 2 kg of CNT fluids at 670° C. A mixed gas of nitrogen, hydrogen, and ethylene gas in the same volumes was allowed to flow at a rate of 10 $m^3/h$ for 1 h, affording a CNT aggregate.

EXAMPLE 1

55% of the total volume of the CNTs synthesized in D of Production Example 1 were collected and the reactor was maintained at a temperature of 670° C. An inert gas was supplied to the reactor to form a fluidized bed of the remaining CNTs. 70 g of the supported catalyst prepared in C of Production Example 1 was supplied to the reactor and a mixed gas of nitrogen, hydrogen, and ethylene gas in the same volumes was allowed to flow at a rate of 10 $m^3/h$ for 1 h, affording a CNT aggregate.

EXAMPLE 2

50% of the total volume of the CNTs synthesized in D of Production Example 1 were collected and the reactor was maintained at a temperature of 670° C. An inert gas was supplied to the reactor to form a fluidized bed of the remaining CNTs. 70 g of the supported catalyst prepared in C of Production Example 1 was supplied to the reactor and a mixed gas of nitrogen, hydrogen, and ethylene gas in the same volumes was allowed to flow at a rate of 10 $m^3/h$ for 1 h, affording a CNT aggregate.

EXAMPLE 3

39.7% of the total volume of the CNTs synthesized in D of Production Example 1 were collected and the reactor was maintained at a temperature of 670° C. An inert gas was supplied to the reactor to form a fluidized bed of the remaining CNTs. 70 g of the supported catalyst prepared in C of Production Example 1 was supplied to the reactor and a mixed gas of nitrogen, hydrogen, and ethylene gas in the same volumes was allowed to flow at a rate of 10 $m^3/h$ for 1 h, affording a CNT aggregate.

EXAMPLE 4

37.1% of the total volume of the CNTs synthesized in D of Production Example 1 were collected and the reactor was maintained at a temperature of 670° C. An inert gas was supplied to the reactor to form a fluidized bed of the remaining CNTs. 70 g of the supported catalyst prepared in C of Production Example 1 was supplied to the reactor and a mixed gas of nitrogen, hydrogen, and ethylene gas in the same volumes was allowed to flow at a rate of 10 $m^3/h$ for 1 h, affording a CNT aggregate.

EXAMPLE 5

36.8% of the total volume of the CNTs synthesized in D of Production Example 1 were collected and the reactor was maintained at a temperature of 670° C. An inert gas was supplied to the reactor to form a fluidized bed of the remaining CNTs. 70 g of the supported catalyst prepared in C of Production Example 1 was supplied to the reactor and a mixed gas of nitrogen, hydrogen, and ethylene gas in the same volumes was allowed to flow at a rate of 10 m³/h for 1 h, affording a CNT aggregate.

EXAMPLE 6

A CNT aggregate was synthesized in the same manner as in Example 1, except that 34.6% of the total volume of the CNTs synthesized in D of Production Example 1 were collected.

EXAMPLE 7

A CNT aggregate was synthesized in the same manner as in Example 1, except that 30.5% of the total volume of the CNTs synthesized in D of Production Example 1 were collected.

COMPARATIVE EXAMPLE 1

A CNT aggregate was synthesized in the same manner as in Example 1, except that 25.5% of the total volume of the CNTs synthesized in D of Production Example 1 were collected.

COMPARATIVE EXAMPLE 2

A CNT aggregate was synthesized in the same manner as in Example 1, except that 20.7% of the total volume of the CNTs synthesized in D of Production Example 1 were collected.

Residual Rates and Conversions

The difference between the top and bottom of each reactor was calculated and the residual rate was determined from the correlations shown in Table 1.

TABLE 1

| Pressure difference (kPa) | Residual rate |
|---|---|
| 0.326 | 0.4 |
| 0.273 | 0.45 |
| 0.24 | 0.5 |
| 0.17 | 0.6 |
| 0.138 | 0.65 |
| 0.124 | 0.7 |
| 0.108 | 0.75 |
| 0.0915 | 0.8 |

Changes in the residual rate of carbon nanotubes and the conversions of ethylene gas to carbon nanotubes in Examples 1-7 and Comparative Example 1-2 are shown in FIG. 3 and Table 2.

TABLE 2

| Example No. | Residual rate × 100 (%) | Conversion (%) |
|---|---|---|
| Example 1 | 45.0 | 50.0 |
| Example 2 | 50.0 | 52.0 |
| Example 3 | 60.3 | 54.7 |
| Example 4 | 62.9 | 55.8 |
| Example 5 | 63.2 | 57.9 |
| Example 6 | 65.4 | 58.4 |
| Example 7 | 69.5 | 61.8 |
| Comparative Example 1 | 74.5 | 66.0 |
| Comparative Example 2 | 79.3 | 70.0 |

As can be seen from FIG. 3, the ethylene conversions exceeded 50%. As the residual rate increased, the ethylene conversion increased. Specifically, the residual rate x and the ethylene conversion y satisfied the following relationship:

$$y=0.57x+22.66$$

These results demonstrate that when some of the CNTs synthesized in the fluidized bed reactor were left as fluidic materials, new CNTs could be produced in a stable and continuous process.

Manufacture and Conductivity Evaluation of Composites 3 wt % of the carbon nanotubes obtained in each of Examples 1-7 and Comparative Examples 1-2 were mixed with 97 wt % of a polycarbonate resin (LUCON PC 1300-22). The mixture was extruded using an extruder as follows. First, the mixture was fed into the extruder through a main feeder. The mixture was melted in the extruder. The resulting composite material was extruded into strands through a die of the extruder. After cooling, the strands were finely cut using a pelletizer to obtain composites in the form of pellets.

The sheet resistance values of the composites were measured and are shown in FIG. 4. The sheet resistance values of the composites including the carbon nanotubes of Comparative Examples 1-2 were found to be much higher than those ($\leq 10^8$ Ω/sq) of the composites including the carbon nanotubes of Examples 1-7.

INDUSTRIAL APPLICABILITY

The method of the present invention enables the production of carbon nanostructures in a continuous process by using some of the as-produced carbon nanostructures as fluidic materials. According to the method of the present invention, an optimal proportion of carbon nanostructures as fluidic materials is provided such that the contact time between a carbon source and a catalyst is extended and the flow of the fluidic materials is optimized, achieving improved conversion efficiency of the carbon source.

What is claimed is:

1. A method for producing carbon nanostructures, comprising:
    contacting a catalyst with reactant gases comprising a carbon source in a fluidized bed reactor;
    converting the carbon source to carbon nanostructures within the fluidized bed reactor, wherein conversion of the carbon source to the carbon nanostructures is 50% or above;
    collecting some of the carbon nanostructures formed within the fluidized bed reactor, wherein some of the carbon nanostructures remain uncollected and are used as fluidic materials in the fluidized bed reactor and wherein a residual rate of the fluidic materials is from 0.4 to 0.7, as calculated by Equation 1:

Residual rate of carbon nanostructures=Volume of remaining carbon nanostructures/(Volume of initially remaining carbon nanostructures+Volume of as-produced carbon nanostructures).   [Equation 1]

2. The method according to claim 1, wherein the residual rate and the conversion of the carbon source satisfy the relation given by Equation 2:

$$y=px+q \quad \text{[Equation 2]}$$

where y is the residual rate, x is the conversion of the carbon source, p is a constant from 0.4 to 0.7 and q is a constant from 15 to 30.

3. The method according to claim 1, wherein the amount of the catalyst supplied to the reactor satisfies the relation given by Equation 3:

Catalyst supply rate=$b/(a+b) \leq 0.1$   [Equation 3]

where a is the weight (g) of the carbon nanostructures remaining in the fluidized bed reactor and b is the weight (g) of the catalyst supplied.

4. The method according to claim 1, further comprising supplying the fluidized bed reactor with additional catalyst, and wherein the collection of the synthesized carbon nanostructures and the supply of the additional catalyst are performed in a continuous process.

5. The method according to claim 1, further comprising supplying the fluidized bed reactor with additional catalyst, wherein initiation of the collection of the synthesized carbon nanostructures and the supply of the additional catalyst are based on a degree of filling of the synthesized carbon nanostructures in the reactor.

6. The method according to claim 1, wherein the reactant gases further comprise a reducing gas and/or an inert gas.

7. The method according to claim 1, wherein the synthesized carbon nanostructures are collected under a flow of an inert gas.

8. The method according to claim 1, wherein the synthesis of carbon nanostructures is continued by continuously supplying the reactant gases comprising a carbon source during the collection of the synthesized carbon nanostructures.

9. The method according to claim 1, wherein an inert gas is continuously supplied to the reactor to form a fluidized bed of the remaining carbon nanostructures even after the collection of the synthesized carbon nanostructures.

10. The method according to claim 1, wherein the reactor comprises a pipe through which the catalyst is supplied, a pipe through which the reactant gases comprising a carbon source are supplied, and a discharge pipe disposed under the bottom of the reactor and through which the synthesized carbon nanostructures are collected.

11. The method according to claim 1, wherein the reactor is a chemical vapor deposition reactor.

12. The method according to claim 1, wherein the carbon nanostructures are carbon nanotubes.

* * * * *